United States Patent [19]

Baker

[11] Patent Number: 4,554,501

[45] Date of Patent: Nov. 19, 1985

[54] VARIABLE SPEED CONSTANT FREQUENCY POWER SYSTEM WITH AUXILIARY DC OUTPUT

[75] Inventor: Donal E. Baker, American Township, Lima County, Ohio

[73] Assignee: Westinghouse Electric Corp., Pittsbugh, Pa.

[21] Appl. No.: 604,690

[22] Filed: Apr. 27, 1984

[51] Int. Cl.⁴ .......................... H02P 9/42; H02P 9/48
[52] U.S. Cl. ........................................ 322/29; 307/16; 322/90
[58] Field of Search ...................... 322/29, 32, 90, 94; 307/16, 22, 26, 47, 87

[56] References Cited

U.S. PATENT DOCUMENTS

| | | | |
|---|---|---|---|
| 2,579,579 | 12/1951 | Hoover | 307/16 |
| 3,710,228 | 1/1973 | Higashino | 322/90 X |
| 4,207,512 | 1/1980 | Taylor | 307/16 X |
| 4,380,725 | 4/1983 | Sherman . | |
| 4,489,323 | 12/1984 | Glennon et al. | 322/29 X |

OTHER PUBLICATIONS

Rosswurm, M. A., "Design Considerations of DC-Link Aircraft Generation Systems," SAE Paper 811081, Oct. 1981.

*Primary Examiner*—R. J. Hickey
*Attorney, Agent, or Firm*—R. P. Lenart

[57] ABSTRACT

A DC-link, variable speed constant frequency power system is provided with an auxiliary DC output. The system includes a variable speed generator for producing a DC voltage on a pair of DC-link conductors. When the generator is operated in its normal speed range, an inverter converts the DC voltage to a constant frequency AC voltage. When the generator is operated at a speed which is below its normal speed range or when an external auxiliary output command signal is received, the DC-link conductors are switched to an auxiliary output line and the DC-link voltage is regulated to maintain the desired auxiliary output voltage level.

11 Claims, 3 Drawing Figures

4,554,501

VARIABLE SPEED CONSTANT FREQUENCY POWER SYSTEM WITH AUXILIARY DC OUTPUT

BACKGROUND OF THE INVENTION

This invention relates to variable speed constant frequency electrical power systems and more particularly to such systems which include an auxiliary DC power output.

Reliability in aircraft electrical power generation systems is a critical item for all types of airplanes. Sophisticated airplanes utilize a "fly by wire" system wherein the airplane flying control surfaces are controlled by a computer. A total power outage would result in the loss of the computer and a subsequent loss of the airplane. Backup power systems for such an aircraft are mandatory. Therefore, it is apparent that the emergency power systems and below idle power systems are always required.

Two types of aircraft electrical power generation systems have found wide acceptance. These include systems of the constant speed generator/mechanical transmission type and newer electronic variable speed constant frequency (VSCF) systems. Both of these systems lack the ability to provide AC power when they are operated below their normal design speed range. Although lower speed capability can be added, it requires a large weight and size penalty. Therefore the demand for such capability from the primary AC power source has been small. Auxiliary power is generally furnished by battery systems which supply a low voltage of for example 28 volts DC.

One type of VSCF system includes a generator which operates at variable speeds to supply a DC voltage to an inverter by way of a pair of DC-link conductors. Previous approaches to providing auxiliary power from DC-link systems were heavy, costly and did not take advantage of the inherent capability of the system. These approaches utilized a separate isolation transformer, rectifier and filter. In some cases, the regulation was done with an active switching regulator. Each of these approaches resulted in the addition of significant weight to the system.

SUMMARY OF THE INVENTION

Electrical power, at less than idle speeds, is typically used on an airplane for prestart engine instrumentation power, ignition devices, etc. In an engine out situation, the engine usually windmills at a speed below idle, yet sufficiently high that some power could be extracted for restart procedures if the power system were capable of delivering it. DC power is needed for the most critical aircraft loads, and a DC-link VSCF system has a source of DC power inherently available. The present invention seeks to take advantage of the inherent capabilities of a DC-link VSCF system to provide backup or auxiliary DC power capability with little weight penalty.

A DC-link, variable speed constant frequency power supply having an auxiliary DC output and constructed in accordance with this invention comprises: a variable speed electrical generator for producing a DC voltage on a pair of DC-link conductors; an inverter for converting this DC voltage to a constant frequency AC output; means for regulating the DC voltage at alternative voltage levels by controlling the output of the generator; and means for switching one of the DC-link conductors to an auxiliary DC output line and for switching the other one of the DC-link conductors to a reference terminal. The system can then be constructed to supply auxiliary DC power when the generator is operated at below rated speed or when an external auxiliary supply command signal is received. An AC generator may be used in combination with a bridge circuit to produce the DC voltage.

The power supply system of this invention can supply auxiliary DC power from a DC-link VSCF system by a method which comprises the steps of: monitoring the speed of the VSCF system generator; connecting one of the DC-link conductors to an auxilary output line and connecting the other DC-link conductor to a reference point when the speed of the generator is below a predetermined speed; and regulating the voltage between the DC-link conductors to maintain a predetermined auxiliary voltage level when the speed of the generator is below the predetermined speed. Alternatively, the DC-link conductors can be connected to the auxiliary output line and reference terminal, respectively, in response to an external auxiliary output command signal, such as an aircraft cockpit command. In that case, auxiliary power can be supplied over the entire operating speed range of the generator.

In general, the DC voltage needed in an auxiliary aircraft power system is 28 volts DC, or about 10% of the normal level of DC-link voltage in a VSCF system. This means that the DC-link system could furnish the desired voltage at approximately 10% of the normal idle speed. This corresponds with the speeds needed for engine restarts, etc. In addition, the required DC power must be filtered to provide low ripple and existing DC-link systems include a filter which typically provides less than 1% ripple at rated current. The required auxiliary voltage level can be controlled by the existing DC-link system regulator.

DESCRIPTION OF THE PREFERRED EMBODIMENTS

Figure 1:
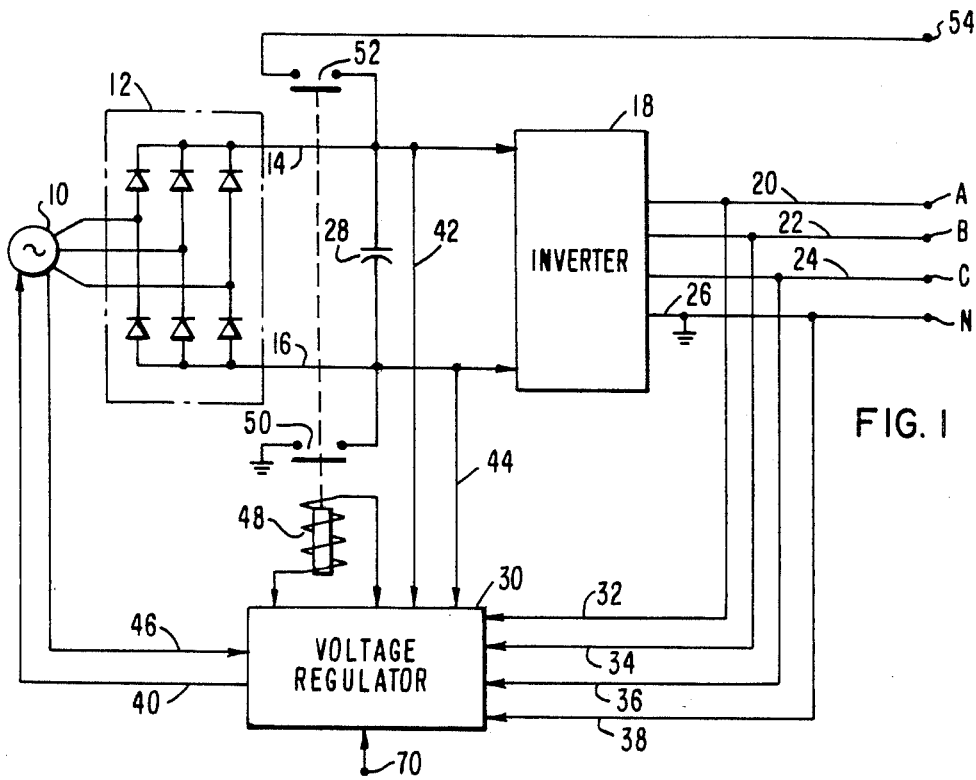
FIG. 1 is a schematic diagram of a power supply system constructed in accordance with one embodiment of the present invention.

FIG. 1 is a schematic diagram of a variable speed constant frequency power system constructed in accordance with one embodiment of the present invention. A variable speed AC generator 10 is connected to a diode bridge 12 which rectifies the generator output to produce a DC voltage on DC-link conductors 14 and 16. An inverter 18 receives power from the DC-link conductors 14 and 16 and produces a three phase output on lines 20, 22 and 24 which are connected to output terminals A, B and C, respectively. A fourth inverter output line 26 is connected to ground and also connected to terminal N. A filter capacitor 28 is connected between DC-link conductors 14 and 16.

A voltage regulator 30 monitors the inverter output voltage by way of lines 32, 34, 36 and 38 and operates to control the DC-link voltage by controlling the exciter field current in generator 10 by way of line 40, thereby controlling the inverter output when the generator is operated within its normal design speed range. Voltage regulator 30 also monitors the DC-link voltage by way of lines 42 and 44 and may, in one embodiment, monitor the generator speed by way of line 46. A relay comprising actuating coil 48 and contacts 50 and 52 provides means for switching DC-link conductor 14 to an auxiliary output terminal 54 and for switching DC-link conductor 16 to a grounded reference point. When the generator is operated at a speed which is below a preselected speed or when an external command signal is received on terminal 70, voltage regulator 30 will energize relay coil 48, thereby connecting the DC-link conductors between the auxiliary power output line and ground. The voltage regulator 30 then acts to maintain the DC-link voltage at the required auxiliary voltage level of for example 28 volts DC.

It should be apparent that the present invention has modified a DC-link VSCF power system through the addition of a grounding contactor or relay, to provide for low voltage auxiliary output power. The existing rectifier bridge 12, filter capacitor 28, and voltage regulator 30 are all utilized. Although the contactor is shown to reference the auxiliary power to the system ground, it should be noted that other reference points can be used.

The rating of the contactor must be adequate to carry the desired auxiliary DC current to the external loads. This may be substantially less than the rating of the generator. If the inverter is not isolated from ground, as with most systems, then it is necessary to inhibit the inverter during the time when auxiliary power is used. There are many aircraft applications which do not need coincident operation of the AC and DC systems in which this approach will suffice.

In the system of FIG. 1, the voltage regulator 30 is connected to the DC-link conductors so that it can regulate the DC level to the desired value of for example 28 volts DC. In existing VSCF systems, the control and voltage regulator for the AC system already have the DC-link voltage available so that connecting the regulator to the DC-link conductors adds no complexity to the existing controls except for a logical enable/disable device such as a signal transistor. For example, the voltage regulator of FIG. 1 is shown to have two sets of inputs. The AC output voltage monitoring lines 32, 34, 36 and 38 are used during normal operation, while the DC-link monitoring lines 42 and 44 supply a backup regulation feature. If the AC output voltage is reduced to zero, for example under fault conditions, then the regulator falls back on the DC-link inputs. The DC-link voltage is then regulated to an intermediate voltage, of for example 100 volts, which is used by the inverter for current limiting.

The DC-link regultion loop is used during auxiliary operation. To provide the necessary conditions for the regulator to maintain 28 volts DC on the link conductors, a signal transistor can be used to disable the inverter, thereby causing the regulator to operate in the DC-link regulating mode. This same transistor can also be used to pull the voltage regulator reference signal down to 28 volts so that the regulator acts to maintain the DC-link voltage at 28 volts DC.

Figure 2:
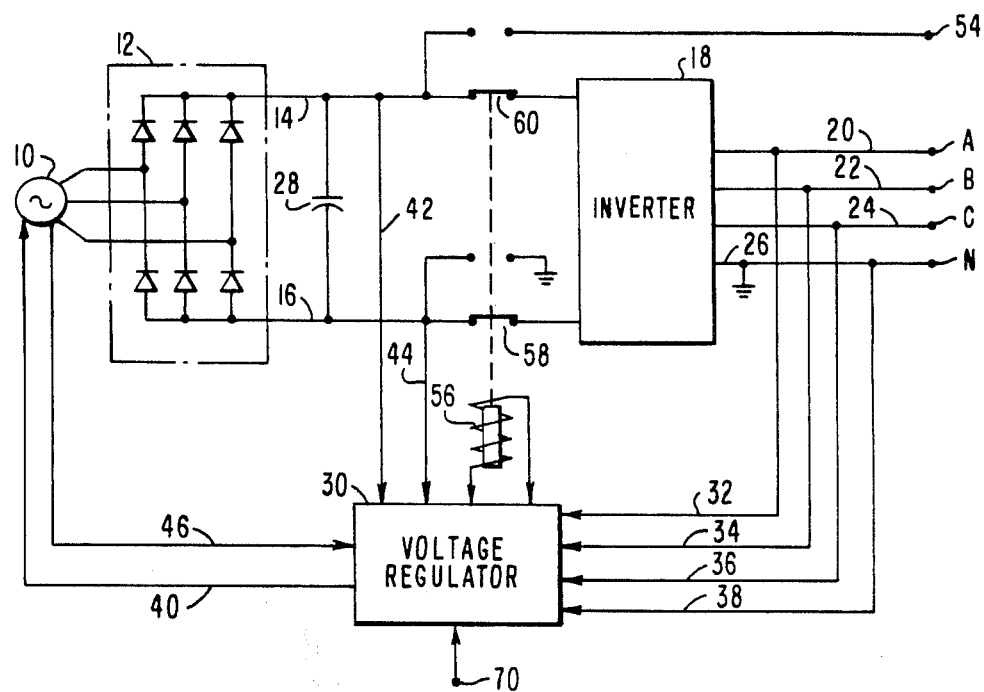
FIG. 2 is a schematic diagram of an alternative embodiment of the present invention.

FIG. 2 is a schematic diagram of an alternative embodiment of the present invention that uses a larger contactor which would be somewhat heavier than the contactor of FIG. 1. The contactor of FIG. 2 again includes an actuating coil 56 and a pair of contacts 58 and 60, but the contacts are connected such that the inverter 18 will be disconnected from the DC-link conductors when auxiliary power is being supplied. Then a failed inverter can be disconnected and auxiliary power can still be furnished. Thus backup auxiliary power can be furnished from a failed unit. In this case, the contactor must have a current rating as least as high as the AC system rating.

It should be apparent that the voltage regulator 30 in FIGS. 1 and 2 is capable of being switched between a normal operating mode and an auxiliary operating mode. In the normal operating mode, it acts to regulate the AC output of the inverter, while in the auxiliary mode, it acts to regulate the DC-link voltage. However, control of the generator exciter field current is utilized in both instances.

Figure 3:
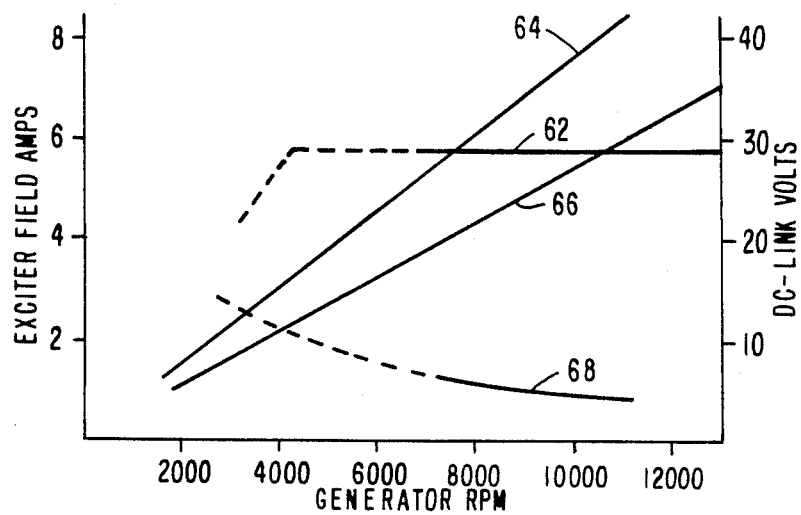
FIG. 3 is a graph which illustrates the operating parameters of a DC-link VSCF system constructed in accordance with this invention.

The curves of FIG. 3 illustrate the operating parameters of a DC-link VSCF system which was used to demonstrate the voltage regulation concept of this invention and the ability of the unit to deliver low voltage DC power. A 20 kVA system was used with a rated DC-link current of 70 amps DC. Curve 62 represents the 28 volt DC output. Curves 64 and 66 represent the available exciter field current at room temperature and at 125° C. respectively. Curve 68 represents the approximate required exciter field amps.

VSCF power systems contructed in accordance with the present invention are particularly suitable for aircraft applications since they are capable of providing auxiliary DC power to critical loads before main AC power is available. This can reduce the time required for takeoff. In addition, if one engine fails, auxiliary power can be provided by engine windmilling. Auxilliary power is also available if the power system inverter fails.

While the present invention has been described in terms of what are at present believed to be the preferred embodiments, it will be apparent to those skilled in the art that various changes may be made without departing from the scope of this invention. It is therefore intended that the appended claims cover all such changes.

What is claimed is:

1. A DC-link, variable speed constant frequency power supply, having an auxiliary DC output, comprising:
   an electrical generator for producing a DC voltage on a pair of DC-link conductors;
   means for regulating said DC voltage at alternative voltage levels by controlling the output of said generator;
   an inverter for converting said DC voltage to a constant frequency AC voltage, when said DC voltage is at a first one of said voltage levels; and
   means for switching a first one of said DC-link conductors to an auxiliary DC output line and for switching the other one of said DC-link conductors to a reference terminal, when said DC voltage is at a second one of said voltage levels.

2. A power supply as recited in claim 1, further comprising:
   means for disabling said inverter when said first DC-link conductor is switched to said DC-output line.

3. A power supply as recited in claim 1, wherein said means for switching comprises:
   a relay having an actuating coil and two pairs of contacts, wherein a first one of said pairs of contacts makes contact between said first DC-link conductor and said output line, and the other pair of contacts makes contact between the other one of said DC-link conductors and said reference terminal.

4. A power supply as recited in claim 3, wherein said first pair of contacts alternatively makes contact between said first DC-link conductor and a first input to said inverter and said second pair of contacts alternatively makes contact between said other one of said DC-link conductors and a second input to said inverter.

5. A power supply as recited in claim 1, wherein said means for regulating said DC voltage maintains said DC voltage at said first level when said generator is driven at a speed which is above a predetermined speed and maintains said DC voltage at said second level when said generator is driven at a speed which is below said predetermined speed.

6. A power supply as recited in claim 1, wherein said means for regulating said DC voltage includes:

a first set of inputs connected to receive the AC output voltage of said inverter; and a second set of inputs connected to receive the DC voltage on said DC-link conductors.

7. A power supply as recited in claim 1, wherein said means for regulating said DC voltage includes means for receiving an external auxiliary command signal such that when said external auxiliary command signal is received, said means for regulating said DC voltage maintains said DC voltage at said second level and in the absence of said external auxiliary command signal, said means for regulating said DC voltage maintains said DC voltage at said first level.

8. A method of operating a DC-link, variable speed constant frequency power supply having a generator which supplies DC power to an inverter via a pair of DC link conductors, said method comprising the steps of:

controlling the generator output voltage to produce a first DC voltage between said DC-link conductors in the absence of an auxiliary output command signal;

controlling the generator output voltage to produce a second DC voltage between said DC-link conductors in response to an auxiliary output command signal; and switching one of said DC-link conductors to an auxiliary output terminal while switching the other DC-link conductor to a reference terminal in response to said auxiliary output command signal.

9. The method of claim 8, further comprising the step of:

disabling the inverter in response to said auxiliary output command signal.

10. A method of supplying auxiliary DC power from a DC-link, variable speed constant frequency power supply having a generator which supplies DC power to an inverter via a pair of DC-link conductors, said method comprising the steps of:

monitoring the speed of the generator;

connecting one of the DC-link conductors to an auxiliary output line and connecting the other DC-link conductor to a reference point when the speed of the generator is below a predetermined speed; and regulating the voltage between said DC-link conductors to maintain a predetermined auxiliary voltage level when the speed of the generator is below said predetermined speed.

11. The method of claim 10, further comprising the step of:

disabling the inverter when the speed of the generator is below said predetermined speed.

* * * * *